US012211429B2

(12) United States Patent
Lim et al.

(10) Patent No.: US 12,211,429 B2
(45) Date of Patent: Jan. 28, 2025

(54) DISPLAY DEVICE INCLUDING DISPLAY PANEL INCLUDING PLURALITY OF DISPLAY AREAS AND METHOD FOR CONTROLLING THE SAME

(71) Applicant: SAMSUNG DISPLAY CO., LTD., Yongin-si (KR)

(72) Inventors: Nam Jae Lim, Yongin-si (KR); Seung Ho Park, Yongin-si (KR); Seung Hwan Park, Yongin-si (KR); Young Woon Choi, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/206,951

(22) Filed: Jun. 7, 2023

(65) Prior Publication Data

US 2024/0169893 A1 May 23, 2024

(30) Foreign Application Priority Data

Nov. 17, 2022 (KR) ........................ 10-2022-0154770

(51) Int. Cl.
*G09G 3/32* (2016.01)

(52) U.S. Cl.
CPC ......... *G09G 3/32* (2013.01); *G09G 2310/027* (2013.01); *G09G 2310/08* (2013.01); *G09G 2320/0271* (2013.01); *G09G 2330/028* (2013.01)

(58) Field of Classification Search
CPC ............... G09G 3/32; G09G 2310/027; G09G 2310/08; G09G 2320/0271; G09G 2330/028
See application file for complete search history.

(56) References Cited

U.S. PATENT DOCUMENTS

| | | | | |
|---|---|---|---|---|
| 9,721,512 | B2 | 8/2017 | Soni et al. | |
| 2017/0162098 | A1* | 6/2017 | Cheon | G09G 3/3225 |
| 2021/0201849 | A1* | 7/2021 | Choi | G09G 3/20 |
| 2021/0350751 | A1* | 11/2021 | Lee | G09G 3/20 |
| 2022/0122563 | A1 | 4/2022 | Pyun et al. | |

FOREIGN PATENT DOCUMENTS

| | | | |
|---|---|---|---|
| KR | 1020210136200 | A | 11/2021 |
| KR | 1020220051087 | A | 4/2022 |

* cited by examiner

*Primary Examiner* — Towfiq Elahi
(74) *Attorney, Agent, or Firm* — CANTOR COLBURN LLP

(57) ABSTRACT

A display device includes a display panel including a plurality of display areas; a driving circuit to control the display panel; a timing controller to control the driving circuit to display an image on the display panel; a storage medium to store a plurality of weight tables respectively corresponding to the plurality of display areas; and a load value generator to generate a first load value corresponding to a first data unit of input image data, and to apply a weight to the first load value based on a first weight table corresponding to a display area in which the first data unit is to be displayed, among the plurality of weight tables. The timing controller controls the driving circuit with reference to a weighted first load value.

12 Claims, 7 Drawing Sheets

WTp

| Gray | Weight |
|---|---|
| GV1 (1) | GWp_1 |
| GV2 (2) | GWp_2 |
| GV3 (3) | GWp_3 |
| GV4 (4) | GWp_4 |
| ⋮ | ⋮ |
| GVm (255) | GWp_m |

DISPLAY DEVICE INCLUDING DISPLAY PANEL INCLUDING PLURALITY OF DISPLAY AREAS AND METHOD FOR CONTROLLING THE SAME

The application claims priority to Korean Patent Application No. 10-2022-0154770, filed on Nov. 17, 2022, and all the benefits accruing therefrom under 35 U.S.C. § 119, the content of which in its entirety is herein incorporated by reference.

BACKGROUND

1. Field

Embodiments of the disclosure relate to an electronic device, and more particularly, to a display device including a display panel having a plurality of display areas and a method for controlling the same.

2. Discussion of the Related Art

A display device may be driven with a relatively fast response speed while consuming relatively low power by a light-emitting diode ("LED") or an organic light-emitting diode ("OLED") that emits light by recombination of electrons and holes.

The luminance of the emitted light may be determined according to a current flowing through the light-emitting diode of each pixel in a display panel. For various purposes, such as minimizing power consumption, the display device may adjust the luminance of the emitted light by controlling a driving circuit according to load values of input image data. For example, the display device may control the luminance of the emitted light by calculating the load values of the input image data and adjusting a current flowing through the display panel based on the calculated load values.

SUMMARY

Display devices and methods for controlling the same are capable of displaying an image with improved reliability. For example, even when a relative ratio between light-emitting efficiency for an intermediate grayscale value and light-emitting efficiency for a maximum grayscale value is different for each display area, pixels in each display area of a display panel may emit light with substantially the same luminance level in response to the same grayscale value of an input image frame.

A display device in an embodiment of the disclosure includes a display panel including a plurality of display areas; a driving circuit controlling the display panel; a timing controller controlling the driving circuit to display an image on the display panel; a storage medium storing a plurality of weight tables respectively corresponding to the plurality of display areas; and a load value generator generating a first load value corresponding to a first data unit of input image data, and applying a weight to the first load value based on a first weight table corresponding to a display area of the plurality of display areas in which the first data unit is to be displayed, among the plurality of weight tables. The timing controller controls the driving circuit with reference to a weighted first load value.

In an embodiment, a first light-emitting efficiency level of a pixel of the display area in which the first data unit corresponding to a maximum grayscale value is to be displayed may be defined, a plurality of second light-emitting efficiency levels of the pixel of the display area respectively corresponding to a plurality of grayscale values may be defined, and the first weight table may include relative values between each of the plurality of second light-emitting efficiency levels and the first light-emitting efficiency level.

In an embodiment, the load value generator may select, as the weight, a relative value corresponding to a grayscale value of the first data unit among the relative values.

In an embodiment, a first light-emitting efficiency level associated with luminance at which a pixel of the display area emit light in response to a maximum grayscale value may be defined, a plurality of second light-emitting efficiency levels associated with luminances at which the pixel of the display area emit light in response to a plurality of grayscale values may be defined, and the first weight table may include relative values between each of the plurality of second light-emitting efficiency levels and the first light-emitting efficiency level.

In an embodiment, the timing controller may scale at least a portion of the input image data with reference to the weighted first load value, and display the image on the display panel according to a scaled input image data.

In an embodiment, the first data unit may include at least one data pixel of the input image data.

In an embodiment, the display device may further include a voltage generator providing a driving voltage to the display panel in response to control of the timing controller, and the timing controller may adjust a level of the driving voltage with reference to the weighted first load value.

In an embodiment, the input image data may further include a second data unit. A display area of the plurality of display areas in which the second data unit is to be displayed may be different from the display area in which the first data unit is to be displayed. The load value generator may generate a second load value corresponding to the second data unit, and apply a second weight to the second load value based on a second weight table corresponding to the display area in which the second data unit is to be displayed among the plurality of weight tables. The timing controller may control the driving circuit with reference to a weighted second load value.

In an embodiment, the input image data may further include a second data unit. The second data unit may be displayed in the display area in which the first data unit is to be displayed, the load value generator may generate a second load value corresponding to the second data unit and apply a second weight to the second load value based on the first weight table, and the timing controller may control the driving circuit with reference to a weighted second load value.

Another embodiment of the disclosure relates to a method for controlling a driving circuit for driving a display panel. The method includes receiving input image data; generating weighted load values respectively corresponding to data units of the input image data; and controlling the driving circuit with reference to the weighted load values. The display panel includes a plurality of display areas, and the generating the weighted load values includes generating a first load value according to a first data unit among the data units; accessing a first weight table corresponding to a display area of the plurality of display areas in which the first data unit is to be displayed among a plurality of weight tables respectively corresponding to the plurality of display areas; and generating a first weighted load value corresponding to the first data unit among the weighted load values by applying a first weight to the first load value according to the first weight table.

In an embodiment, a display area of the plurality of display areas in which a second data unit among the data units is to be displayed may be different from the display area in which the first data unit is to be displayed, and the generating the weighted load values may further include generating a second load value according to the second data unit; accessing a second weight table corresponding to the display area in which the second data unit is to be displayed among the plurality of weight tables; and generating a second weighted load value corresponding to the second data unit among the weighted load values by applying a second weight to the second load value according to the second weight table.

In an embodiment, a second data unit among the data units may be displayed in the display area in which the first data unit is to be displayed, and the generating the weighted load values may further include generating a second load value according to the second data unit; and generating a second weighted load value corresponding to the second data unit among the weighted load values by applying a second weight to the second load value according to the first weight table.

In an embodiment, the first data unit may include at least one data pixel of the input image data.

In an embodiment, a first light-emitting efficiency level of a pixel of the display area in which the first data unit corresponding to a maximum grayscale value is to be displayed may be defined, a plurality of second light-emitting efficiency levels of the pixel of the display area respectively corresponding to a plurality of grayscale values may be defined, and the first weight table may include relative values between each of the plurality of second light-emitting efficiency levels and the first light-emitting efficiency level.

In an embodiment, the generating the first weighted load value may include selecting a relative value corresponding to a grayscale value of the first data unit as the first weight among the relative values.

BRIEF DESCRIPTION OF THE DRAWINGS

The accompanying drawings, which are included to provide a further understanding of the inventive concepts, and are incorporated in and constitute a part of this specification, illustrate embodiments of the inventive concepts, and, together with the description, serve to explain principles of the inventive concepts.

DETAILED DESCRIPTION

Figure 1:
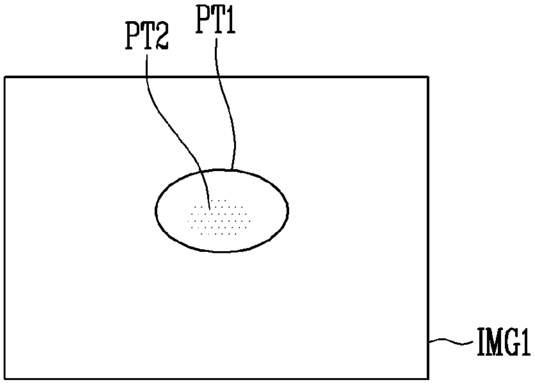
FIG. 1 is a diagram illustrating a first image displayed by a display device when a first image frame having a predetermined image pattern is received at the center.

As the disclosure allows for various changes and numerous embodiments, particular embodiments will be illustrated in the drawings and described in detail in the written description. However, this is not intended to limit the disclosure to particular modes of practice, and it is to be appreciated that all changes, equivalents, and substitutes that do not depart from the spirit and technical scope of the disclosure are encompassed in the disclosure.

It will be understood that, although the terms "first", "second", etc. may be used herein to describe various elements, these elements should not be limited by these terms. These terms are only used to distinguish one element from another element. For instance, a first element discussed below could be termed a second element without departing from the scope of the disclosure. Similarly, the second element could also be termed the first element. In the disclosure, the singular expressions are intended to include the plural expressions as well, unless the context clearly indicates otherwise.

It will be further understood that the terms "comprise", "include", "have", etc. used in the disclosure, specify the presence of stated features, integers, steps, operations, elements, components, or combinations of them but do not preclude the presence or addition of one or more other features, integers, steps, operations, elements, components, or combinations thereof.

Advantages and features of the disclosure and methods of achieving them will become apparent with reference to the embodiments described below in detail in conjunction with the accompanying drawings. However, the disclosure is not limited to the embodiments disclosed below and may be implemented in various different forms. In the following description, when a first part is connected to a second part, this includes not only the case where the first part is directly connected to the second part, but also the case where a third part is interposed therebetween and they are electrically connected to each other. In embodiments of the disclosure, "connection" between two components may mean to encompass both an electrical connection and a physical connection.

Figure 2:
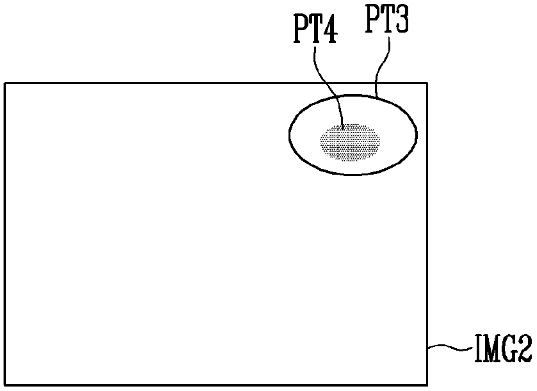
FIG. 2 is a diagram illustrating a second image displayed by the display device when a second image frame having the same image pattern is received at the upper right corner.

FIG. 1 is a diagram illustrating a first image displayed by a display device when a first image frame having a predetermined image pattern is received at the center. FIG. 2 is a diagram illustrating a second image displayed by the display device when a second image frame having the same image pattern is received at the upper right corner.

Referring to FIG. 1, the first image frame may include data pixels having a maximum grayscale value at the center and data pixels having an intermediate grayscale value (or a grayscale value lower than the maximum grayscale value and higher than a minimum grayscale value). The first image frame may be visualized as a first image IMG1 by a display device shown in FIG. 3. At the center of a display panel, pixels may express a first image pattern PT1 by emitting light with a first luminance level in response to the data pixels having the maximum grayscale value of the first image frame, and may express a second image pattern PT2 by emitting light with a second luminance level in response to the data pixels having the intermediate grayscale value of the first image frame.

Referring to FIG. 2, the second image frame may have substantially the same patterns as the first image frame at the upper right corner. The second image frame may include data pixels having the maximum grayscale value at the upper right corner and data pixels having the intermediate grayscale value like the first image frame. As shown in FIG. 2, the second image frame may be visualized as a second image IMG2 by the display device. At the upper right corner of the display panel, pixels may express a third image pattern PT3 by emitting light with a third luminance level in response to the data pixels having the maximum grayscale value of the second image frame, and may express a fourth image pattern PT4 by emitting light with a fourth luminance level in response to the data pixels having the intermediate grayscale value of the second image frame.

A relative ratio (or difference) of the fourth luminance level to the third luminance level may be different from a relative ratio (or difference) of the second luminance level to the first luminance level. This may be because a relative ratio between light-emitting efficiency for the intermediate grayscale value and light-emitting efficiency for the maximum grayscale value of each pixel is different depending on the location of a corresponding pixel on the display panel.

When a ratio between the third luminance level and the fourth luminance level is different from a ratio between the first luminance level and the second luminance level, a person may visually recognize that the third and fourth patterns PT3 and PT4 are different from the first and second patterns PT1 and PT2. In an embodiment, when the relative ratio of the fourth luminance level to the third luminance level is lower than the relative ratio of the second luminance level to the first luminance level, as shown in FIGS. 1 and 2, a person may visually recognize the fourth pattern PT4 as relatively dark and visually recognize the second pattern PT2 as relatively bright, for example.

Figure 3:
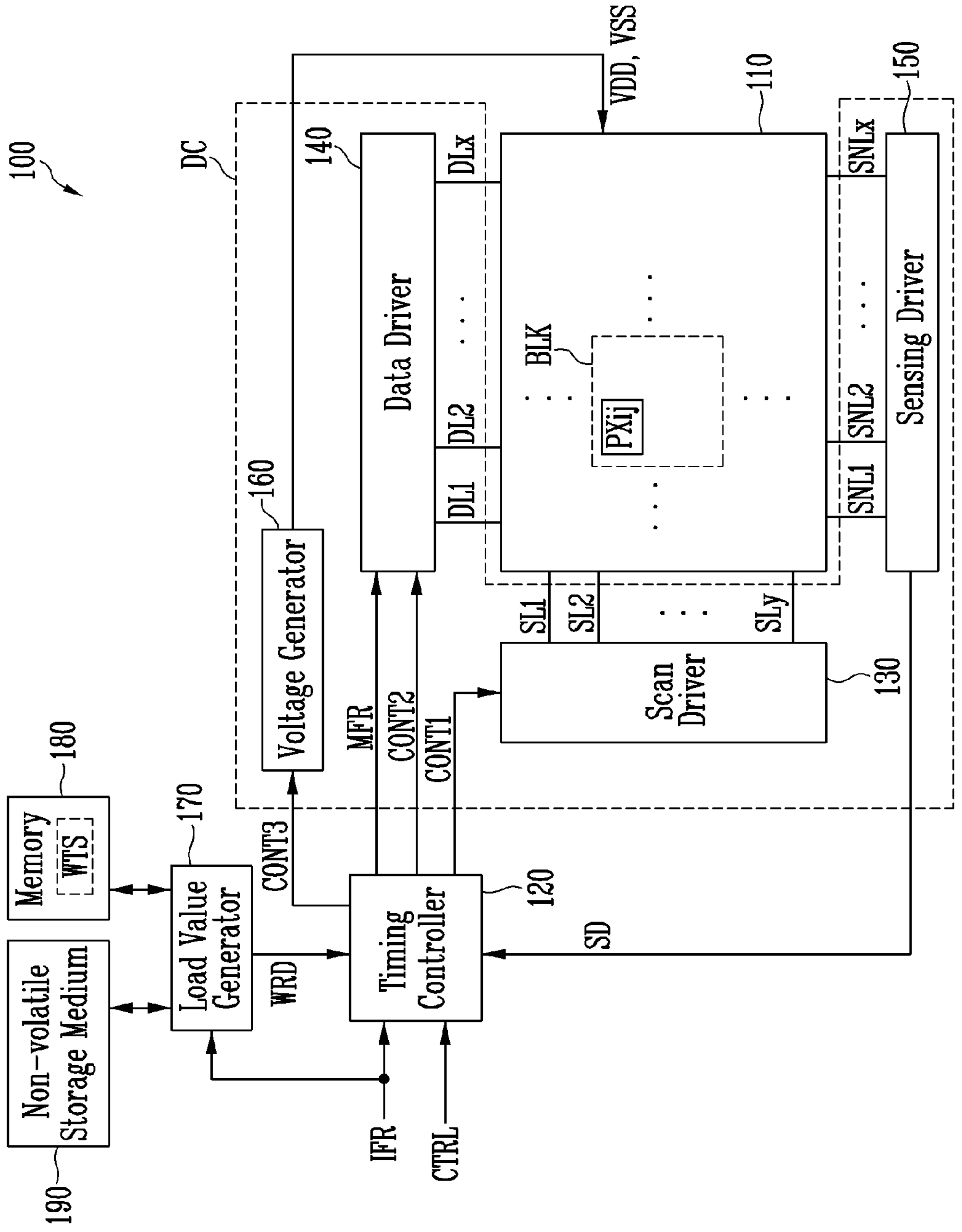
FIG. 3 is a block diagram illustrating an embodiment of a display device according to the disclosure.
Figure 4:
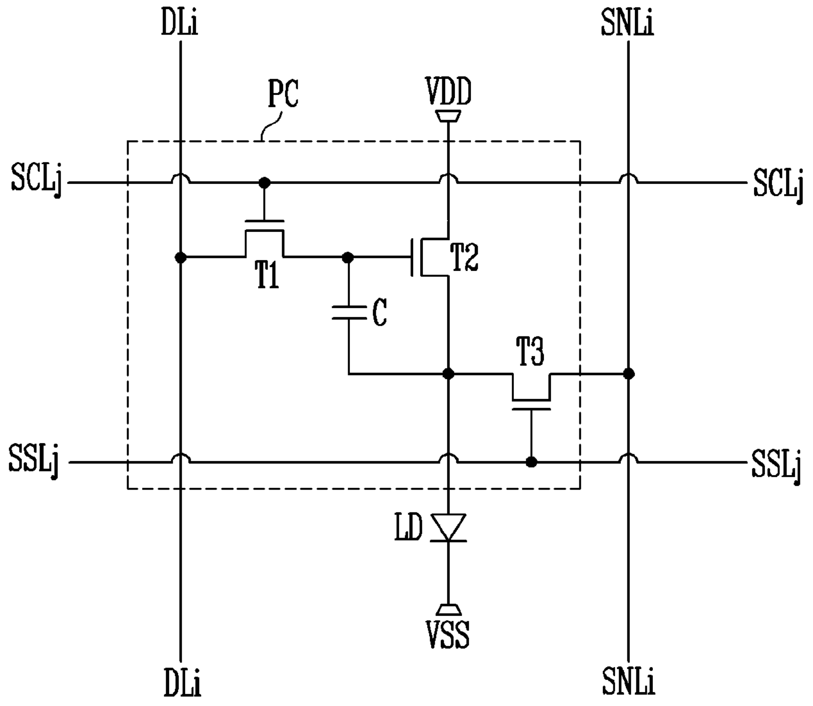
FIG. 4 is a circuit diagram illustrating an embodiment of one of pixels included in a display panel of FIG. 3.

FIG. 3 is a block diagram illustrating an embodiment of a display device according to the disclosure. FIG. 4 is a circuit diagram illustrating an embodiment of one of pixels included in a display panel of FIG. 3.

Referring to FIG. 3, a display device 100 may include a display panel 110, a timing controller 120, a scan driver 130, a data driver 140, a sensing driver 150, and a voltage generator 160.

The display panel 110 may include pixels. The pixels may be connected to the scan driver 130 through first to y-th scan lines SL1 to SLy, and connected to the data driver 140 through first to x-th data lines DL1 to DLx. Here, x and y are natural numbers.

Referring to FIG. 4, each pixel PXij may include a light-emitting element LD and a pixel circuit PC connected thereto to drive the light-emitting element LD. In FIG. 4, among the pixels included in the display panel 110 of FIG. 3, a pixel PXij connected to an i-th data line DLi (where i may be an integer greater than or equal to 1 and less than or equal to x) and a j-th scan line SLj (where j may be an integer greater than or equal to 1 and less than or equal to y) is shown. Other pixels may be configured similarly to the pixel PXij in FIG. 4.

A first electrode (e.g., an anode electrode) of the light-emitting element LD may be connected to a first driving voltage line to which a first driving voltage VDD is applied through the pixel circuit PC, and a second electrode (e.g., a cathode electrode) of the light-emitting element LD may be connected to a second driving voltage line to which a second driving voltage VSS is applied. The first driving voltage VDD may be a positive voltage, and the second driving voltage VSS may be a negative voltage. The amount of current flowing through the light-emitting element LD may be controlled by the pixel circuit PC, and the light-emitting element LD may emit light with a luminance corresponding to the controlled amount of current.

The light-emitting element LD may be an organic light-emitting diode. In addition, the light-emitting element LD may be an inorganic light-emitting diode such as a micro light-emitting diode ("LED") or a quantum dot light-emitting diode. In addition, the light-emitting element LD may be an element composed of a combination of an organic material and an inorganic material.

In some embodiments, the pixel circuit PC may include a plurality of transistors T1, T2, and T3, a capacitor C, and the light-emitting element LD. A switching transistor T1 may be turned on in response to a scan selection signal of a j-th scan selection line SCLj to connect a gate of a driving transistor T2 to the i-th data line DLi. In this case, a grayscale voltage may be supplied to the i-th data line DLi. Accordingly, the grayscale voltage may be transmitted to the gate of the driving transistor T2. The grayscale voltage may be stored in the capacitor C.

The driving transistor T2 may be connected between the first driving voltage VDD and the anode electrode of the light-emitting element LD, and may have a gate connected to one end of the switching transistor T1. The capacitor C may be connected between the gate of the driving transistor T2 and the anode electrode of the light-emitting element LD. The driving transistor T2 may be turned on according to the grayscale voltage stored in the capacitor C, so that a current corresponding to the grayscale voltage may flow from the first driving voltage VDD to the second driving voltage VSS.

A sensing transistor T3 may be connected to an i-th sensing line SNLi. A gate of the sensing transistor T3 may be turned on in response to a sensing selection signal applied to a j-th sensing selection line SSLj to connect the pixel circuit PC and/or the anode electrode of the light-emitting element LD to the i-th sensing line SNLi. Accordingly, the sensing driver 150 of FIG. 3 may generate sensing data SD (refer to FIG. 3) by sensing electrical characteristics (e.g., the amount of current) of the pixel circuit PC and/or the light-emitting element LD through the i-th sensing line SNLi.

The j-th scan selection line SCLj and the j-th sensing selection line SSLj may be included in the j-th scan line SLj of FIG. 3.

In FIG. 4, the transistors T1, T2 and T3 of the pixel circuit PC are shown as N-type transistors. However, the disclosure is not limited thereto. At least one of the transistors T1, T2, and T3 of the pixel circuit PC may be provided as a P-type transistor.

Referring back to FIG. 3, the timing controller 120 may control overall operations of the display device 100. The timing controller 120 may receive an input image frame IFR and control signals CTRL for controlling its display, e.g., a vertical synchronization signal, a horizontal synchronization signal, a main clock signal, a data enable signal, or the like from outside. The timing controller 120 may generate a modified image frame MFR by processing the input image frame IFR. In some embodiments, the timing controller 120 may adjust the timing of the modified image frame MFR based on the control signals CTRL.

The timing controller 120 may transmit a first control signal CONT1 to the scan driver 130, a second control signal CONT2 to the data driver 140, and a third control signal CONT3 to the voltage generator 160 based on the control signals CTRL. In some embodiments, the first control signal CONT1 may include a vertical synchronization start signal, an output enable signal, or the like, and the second control signal CONT2 may include a clock signal, a line latch signal, or the like.

The voltage generator 160 may generate a plurality of voltages and clock signals desired for the operation of the display panel 110. The voltage generator 160 may be operated in response to the third control signal CONT3 from the timing controller 120. In some embodiments, the voltage generator 160 may adjust levels of the first driving voltage VDD and the second driving voltage VSS in response to the third control signal CONT3. The first driving voltage VDD and the second driving voltage VSS may be provided to the pixels of the display panel 110.

The scan driver 130 may drive each of the first to y-th scan lines SL1 to SLy in response to the first control signal CONT1 from the timing controller 120. In some embodiments, the scan driver 130 may include a gate driving integrated circuit ("IC"). The scan driver 130 may be formed simultaneously with the pixels of the display panel 110.

The data driver 140 may drive the first to x-th data lines DL1 to DLx in response to the second control signal CONT2. The data driver 140 may output grayscale voltages corresponding to the modified image frame MFR to the first to x-th data lines DL1 to DLx in response to the second control signal CONT2.

When each of the scan lines SL1 to SLy is driven with a gate-on voltage by the scan driver 130, the grayscale voltages corresponding to the modified image frame MFR may be applied to the data lines DL1 to DLx by the data driver 140. Accordingly, the grayscale voltages corresponding to the modified image frame MFR may be provided to pixels of a corresponding scan line, and the pixels may emit light with luminance corresponding to the grayscale voltages. Accordingly, an image may be displayed on the display panel 110.

The sensing driver 150 may be connected to columns of the pixels of the display panel 110 through the first to x-th sensing lines SNL1 to SNLx in response to the control of the timing controller 120. The sensing driver 150 may generate the sensing data SD by sensing electrical characteristics of pixels of a selected row through the first to x-th sensing lines SNL1 to SNLx. The timing controller 120 may perform various operations, such as scaling the input image frame IFR with reference to the sensing data SD.

Components of the display device 100 connected to the display panel 110 together with the scan driver 130, the data driver 140, the sensing driver 150, and the voltage generator 160 to apply current, voltages, and/or signals to the display panel 110 may constitute a driving circuit DC. As described above, the driving circuit DC may be operated in response to the control of the timing controller 120.

In an embodiment of the disclosure, a non-volatile storage medium 190 may store a weight table set WTS including a plurality of weight tables. A load value generator 170 may load the weight table set WTS from the non-volatile storage medium 190 into a memory 180 and access the weight table set WTS in the memory 180. The weight table set WTS may include weight tables respectively corresponding to a plurality of display areas of the display panel 110. In this case, a weight table may include weights respectively corresponding to grayscale values. Each weight may be associated with a relative ratio between light-emitting efficiency for a corresponding grayscale value and light-emitting efficiency for the maximum grayscale value.

The load value generator 170 may generate load values according to grayscale values of the input image frame IFR and to generate weighted load data WRD by applying weights to the load values of the input image frame IFR based on a weight table that is different for each display area of the display panel 110.

In some embodiments, the memory 180 may include random-access memory ("RAM"), dynamic RAM ("DRAM"), static RAM ("SRAM"), synchronous dynamic RAM ("SDRAM"), double data rate synchronous dynamic random access memory ("DDR SDRAM"), or the like.

In some embodiments, the non-volatile storage medium 190 may include at least one of storage media such as a flash memory that retains data even when power is cut off.

The timing controller 120 may control components for driving the display panel 110, such as the driving circuit DC, with reference to the weighted load data WRD. In some embodiments, the timing controller 120 may generate the modified image frame MFR by scaling the input image frame IFR with reference to the weighted load data WRD. In an embodiment, when a weighted load value corresponding to an arbitrary display area of the display panel 110 is relatively high, data pixels of image data corresponding to the display area may be modified (or compensated) according to the weighted load value and scaled to have increased grayscale values, for example. In an embodiment, when a weighted load value corresponding to an arbitrary display area of the display panel 110 is relatively low, data pixels of image data corresponding to the display area may be modified according to the weighted load value and scaled to have reduced grayscale values, for example. Accordingly, even when the relative ratio between the light-emitting efficiency for the intermediate grayscale value and the light-emitting efficiency for the maximum grayscale value is different for each display area, pixels in each display area of the display panel 110 may emit light with substantially the same luminance level in respond to the same grayscale value of the input image frame IFR. Accordingly, the display device 100 displaying an image with improved reliability may be provided.

In addition, the timing controller 120 may control other operations of the display device 100 with reference to the weighted load data WRD. In some embodiments, the timing controller 120 may adjust the level of the first driving voltage VDD of FIG. 4 with reference to the weighted load data WRD. In an embodiment, when a maximum weighted load value of the weighted load data WRD decreases, the level of the first driving voltage VDD may decrease, for example.

Figure 5:
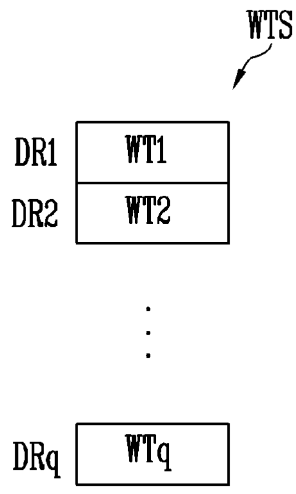
FIG. 5 is a diagram conceptually illustrating a weight table set of FIG. 1.
Figure 6:
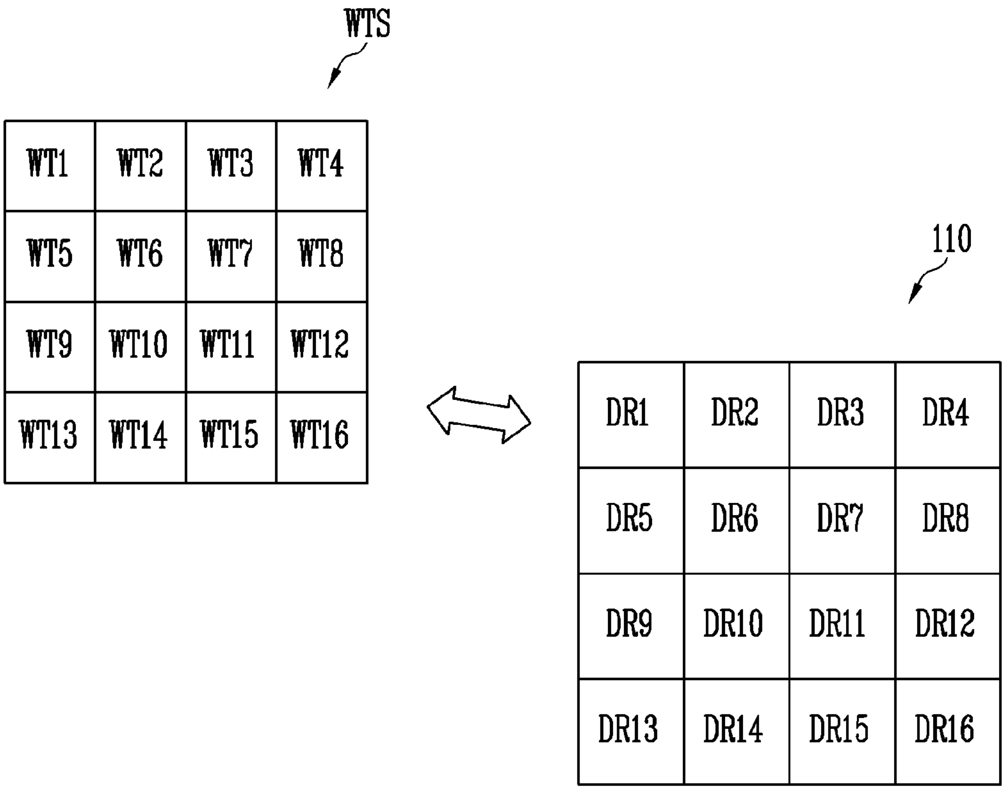
FIG. 6 is a diagram illustrating a relationship between weight tables and display areas of the display panel of FIG. 3.

FIG. 5 is a diagram conceptually illustrating a weight table set of FIG. 1. FIG. 6 is a diagram illustrating a relationship between weight tables and display areas of the display panel of FIG. 3.

Referring to FIG. 5, the weight table set WTS may include first to q-th weight tables WT1 to WTq. The first to q-th weight tables WT1 to WTq may correspond to first to q-th display areas DR1 to DRq of the display panel 110 (refer to FIG. 3), respectively. In an embodiment, as shown in FIG. 6, the display panel 110 may be divided into first to sixteenth display areas DR1 to DR16, and the weight table set WTS may include first to sixteenth weight tables WT1 to WT16 respectively corresponding to the first to sixteenth display areas DR1 to DR16, for example.

In some embodiments, each of the first to q-th weight tables WT1 to WTq may be experimentally determined and stored in the non-volatile storage medium 190.

Figures 7, 8:
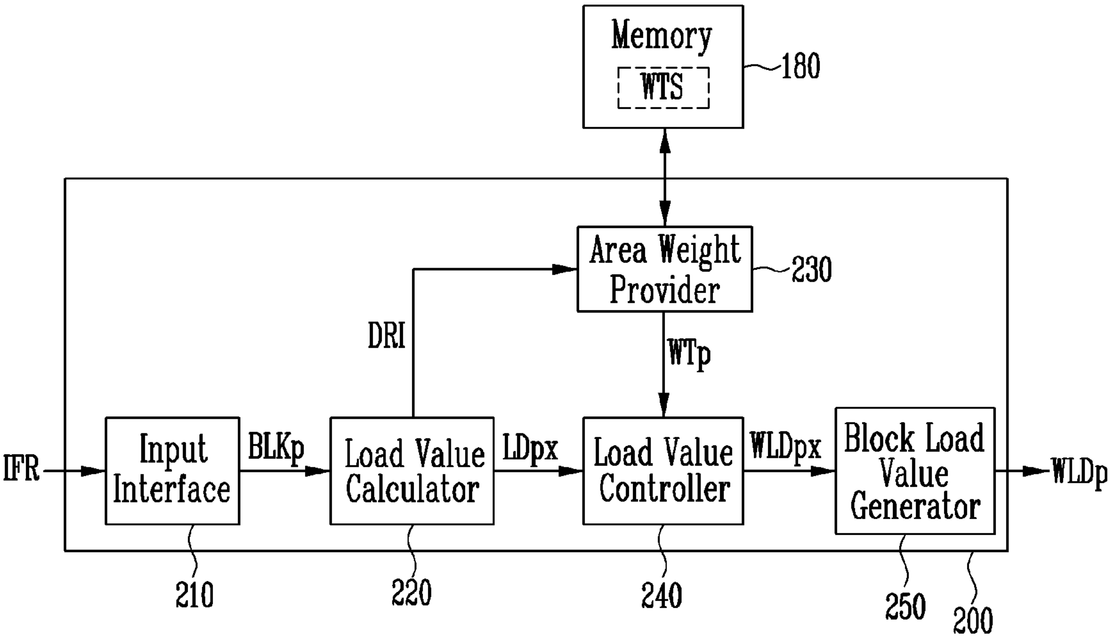
FIG. 7 is a diagram illustrating weights included in any one of first to q-th weight tables WT1 to WTq of FIG. 5.
FIG. 8 is a diagram illustrating an embodiment of a load value generator of FIG. 3.

FIG. 7 is a diagram illustrating weights included in any one of first to q-th weight tables WT1 to WTq of FIG. 5.

Referring to FIG. 7, the p-th weight table WTp (where p may be an integer greater than or equal to 1 and less than or equal to q) may include first to m-th weights GWp_1 to GWp_m respectively corresponding to first to m-th grayscale values GV1 to GVm. In an embodiment, each data pixel of the input image frame IFR of FIG. 3 may have a grayscale value ranging from 0 to 255, and the first to m-th grayscale values GV1 to GVm may be 0 to 255, respectively, for example. In this case, the first to m-th weights GWp_1 to GWp_m may correspond to 0 to 255, respectively. As described with reference to FIGS. 5 and 6, the p-th weight table WTp may correspond to a p-th display area DRp of the display panel 110.

The first to m-th weights GWp_1 to GWp_m of the p-th weight table WTp may be experimentally determined. In some embodiments, each of the first to m-th weights GWp_1 to GWp_m may be determined as in Equation 1 below.

$$GWp\_n=(EL\_GVm)/(EL\_GVn) \quad \text{[Equation 1]}$$

In Equation 1, EL_GVm may represent light-emitting efficiency of an arbitrary pixel of the p-th display area DRp corresponding to the m-th grayscale value GVm, that is, the maximum grayscale value, EL_GVn may represent light-emitting efficiency of an arbitrary pixel of the p-th display area DRp corresponding to an n-th grayscale value GVn, and GWp_n may represent an n-th weight corresponding to the n-th grayscale value GVn. According to Equation 1, the m-th weight GWp_m corresponding to the m-th grayscale value GVm, that is, the maximum grayscale value, may be 1.

The light-emitting efficiency EL_GVm may represent luminance of light emitted by a pixel of the p-th display area DRp (or current actually flowing in a corresponding light-emitting element) in response to the m-th grayscale value GVm, that is, the maximum grayscale value. The light-emitting efficacy EL_GVn may represent luminance of light emitted by a pixel of the p-th display area DRp (or current actually flowing through a corresponding light-emitting element) in response to the n-th grayscale value GVn. The n-th weight GWp_n may be understood as a reciprocal of a relative value of the light-emitting efficiency EL_GVn to the light-emitting efficiency EL_GVm.

Referring back to FIG. 3, the load value generator 170 may generate the load values corresponding to data units of the input image frame IFR. The load value generator 170 may obtain (or select) weights (at least some of GWp_1 to GWp_m of FIG. 7) corresponding to grayscale values of the data units from a weight table (e.g., WTp of FIG. 7) corresponding to a display area (e.g., DRp) in which the data units are to be displayed. Subsequently, the load value generator 170 may generate weighted load values corresponding to the data units by applying the weights to the load values. The weighted load data WRD may be determined according to the weighted load values.

In some embodiments, a data unit may be at least one data pixel of the input image frame IFR. In some embodiments, the input image frame IFR may be divided into a plurality of image blocks, the plurality of image blocks may include a plurality of data pixels, and the data unit may be an image block. Hereinafter, for convenience of description, it is assumed that the data unit is a data pixel.

In some embodiments, the weighted load value for the data pixel of the input image frame IFR may be calculated according to Equation 2 below. For convenience of description, it is assumed that the data pixel may be displayed in the p-th display area DRp.

$$WRVpx=\left(\frac{GVn}{GVm}\right)^{2.2}\times \mathrm{GWp\_n} \quad \text{[Equation 2]}$$

In Equation 2, GVn may represent the n-th grayscale value, and GVm may represent the m-th grayscale value, that is, the maximum grayscale value. GWp_n may represent the n-th weight corresponding to the n-th grayscale value GVn.

$$\left(\frac{GVn}{GVm}\right)^{2.2}$$

may represent a load value of a data pixel, and WRVpx may represent the weighted load value corresponding to the data pixel, which is calculated by multiplying the load value by the n-th weight GWp_n.

As such, in the embodiment of the disclosure, the first to q-th weight tables WT1 to WTq respectively corresponding to the first to q-th display areas DR1 to DRq may be provided, and the weighted load value corresponding to a data pixel may be determined based on a weight table corresponding to a display area in which the data pixel is to be displayed. The timing controller 120 may display an image on the display panel 110 by controlling the driving circuit DC with reference to the weighted load values corresponding to the data pixels of the input image frame IFR. In some embodiments, the timing controller 120 may generate the modified image frame MFR by scaling the input image frame IFR based on the weighted load values.

Figure 9:
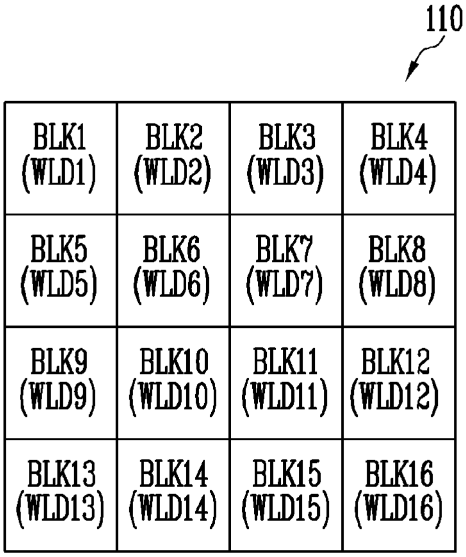
FIG. 9 is a diagram conceptually illustrating weighted load data output by the load value generator of FIG. 3 in association with image blocks of an input image frame.

FIG. 8 is a diagram illustrating an embodiment of a load value generator of FIG. 3. FIG. 9 is a diagram conceptually illustrating weighted load data output by the load value generator of FIG. 3 in association with image blocks of an input image frame.

Referring to FIGS. 8 and 9, a load value generator 200 may include an input interface 210, a load value calculator 220, an area weight provider 230, a load value controller 240, and a block load value generator 250.

The input image frame IFR may include image blocks to be respectively displayed in the display areas of the display panel 110 (refer to FIG. 3). In an embodiment, as shown in FIG. 9, the input image frame IFR may include first to sixteenth image blocks BLK1 to BLK16, and the first to sixteenth image blocks BLK1 to BLK16 may correspond to the first to sixteenth display areas DR1 to DR16 of FIG. 6, respectively, for example.

The input interface 210 may receive the input image frame IFR and provide each of the first to sixteenth image blocks BLK1 to BLK16 of the input image frame IFR to the load value calculator 220. In some embodiments, the input interface 210 may function as a data buffer. In FIG. 8, for convenience of description, in an embodiment, the p-th image block BLKp is provided to the load value calculator 220.

The load value calculator 220 may calculate a load value LDpx corresponding to each data pixel of the p-th image block BLKp. In an embodiment, the load value calculator 220 may calculate the load value LDpx as described with reference to Equation 2, for example.

The load value calculator 220 may provide a display area identifier DRI in which a corresponding data pixel is to be displayed to the area weight provider 230. In an embodiment, the display area identifier DRI indicating the p-th display area DRp in which the p-th image block BLKp is to be displayed may be provided to the area weight provider 230, for example.

The area weight provider 230 may provide a weight table corresponding to the display area identifier DRI among the stored weight table set WTS to the load value controller 240 from the memory 180. In an embodiment, the p-th weight table WTp corresponding to the p-th display area DRp may be provided to the load value controller 240, for example.

The load value controller 240 may generate a weighted load value WLDpx by adjusting the load value LDpx according to the weight of the p-th weight table WTp. In an embodiment, the load value controller 240 may calculate the weighted load value WLDpx as described with reference to Equation 2, for example.

Based on the weighted load values determined in this way, the weighted load data WRD of FIG. 3 may be generated.

In some embodiments, a block load value generator 250 may be further provided. The block load value generator 250 may receive the weighted load value WLDpx corresponding to each data pixel of the p-th image block BLKp, and determine a representative weighted load value WLDp corresponding to the p-th image block BLKp according to received weighted load values. The representative weighted load value WLDp may be determined according to various methods. In an embodiment, an average of the received weighted load values may be determined as the representative weighted load value WLDp, for example. In another embodiment, a sum of the received weighted load values may be determined as the representative weighted load value WLDp.

As such, the load value generator 200 may generate representative weighted load values respectively corresponding to the image blocks included in the input image frame IFR, and may provide the representative weighted load values as the weighted load data WRD. As shown in FIG. 9, the load value generator 200 may generate first to sixteenth representative weighted load values WLD1 to WLD16 respectively corresponding to the first to sixteenth image blocks BLK1 to BLK16.

Figure 10:
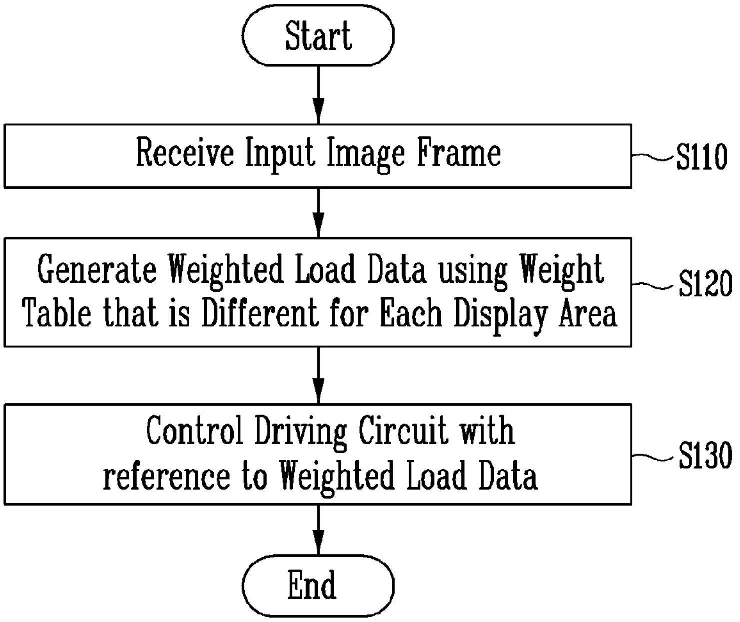
FIG. 10 is a flowchart illustrating an embodiment of a method of controlling a driving circuit for driving a display panel according to the disclosure.

FIG. 10 is a flowchart illustrating an embodiment of a method of controlling a driving circuit for driving a display panel according to the disclosure.

Referring to FIGS. 3 and 10, in operation S110, an input image frame IFR may be received. In operation S120, weighted load data WRD corresponding to the input image frame IFR may be generated using a weight table that is different for each display area. A weighted load value may be determined by applying a weight to a load value corresponding to a grayscale value of the input image frame IFR.

In operation S130, an image may be displayed on the display panel 110 by controlling the driving circuit DC with reference to the weighted load data WRD.

It may be understood that data pixels included in the input image frame IFR are displayed through a plurality of display areas of the display panel 110. When light-emitting efficiency for an intermediate grayscale value is defined as a first light-emitting efficiency and light-emitting efficiency for a maximum grayscale value is defined as a second light-emitting efficiency, a relative ratio of the first light-emitting efficiency to the second light-emitting efficiency may be different for each display area. In embodiments of the disclosure, the weighted load data WRD corresponding to the input image frame IFR may be generated using a weight table different for each display area, and an image may be displayed on the display panel 110 with referenced to the weighted load data WRD. Accordingly, pixels in each display area of the display panel 110 may emit light with substantially the same luminance level in response to the same grayscale value of the input image frame IFR. Accordingly, a method of displaying an image with improved reliability may be provided.

Figure 11:
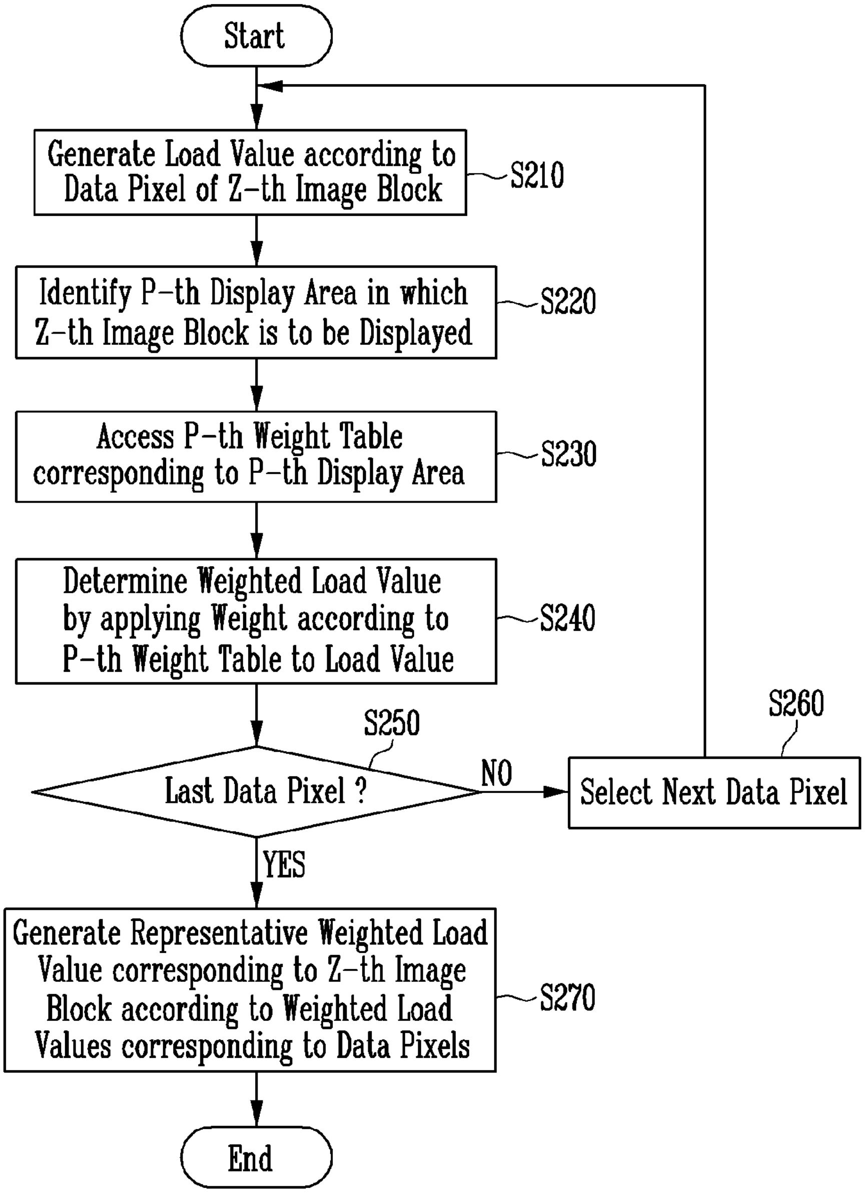
FIG. 11 is a flowchart illustrating an embodiment of operation S120 of FIG. 10.

FIG. 11 is a flowchart illustrating an embodiment of operation S120 of FIG. 10.

The input image frame IFR may include a plurality of image blocks such as the first to sixteenth image blocks BLK1 to BLK16 of FIG. 9. Representative weighted load values respectively corresponding to the plurality of image blocks may be generated, and the generated representative weighted load values may constitute the weighted load data WRD. A representative weighted load value corresponding to each of the plurality of image blocks may be generated in the embodiment of FIG. 11.

Referring to FIGS. 3 and 11, in operation S210, a load value may be generated according to a data pixel of a z-th image block of the input image frame IFR.

In operation S220, a p-th display area in which the z-th image block (or data pixel) is to be displayed may be identified. In operation S230, among a weight table set WTS, a p-th weight table corresponding to the p-th display area may be accessed.

In operation S240, a weighted load value corresponding to a corresponding data pixel may be determined by applying a weight according to the p-th weight table to the load value generated in operation S210.

In operation S250, operation S260 may be performed depending on whether the corresponding data pixel is the last data pixel. In operation S260, the next data pixel may be selected. Thereafter, operations S210 to S250 may be performed again.

In operation S270, a representative weighted load value corresponding to the z-th image block may be generated according to weighted load values corresponding to data pixels of the z-th image block. In some embodiments, an average of the weighted load values may be determined as the representative weighted load value. In other embodiments, a sum of the weighted load values may be determined as the representative weighted load value.

Effects according to the disclosure is not limited by the above-described contents, and more various other effects are included in the specification.

As described above, the optimal embodiments of the disclosure have been disclosed through the detailed description and the drawings. However, those skilled in the art or those of ordinary skill in the art will appreciate that various modifications and changes are possible without departing from the spirit and technical scope of the disclosure as set forth in the claims below.

Therefore, the technical protection scope of the disclosure is not limited to the detailed description described in the specification, but should be determined by the appended claims.

What is claimed is:

1. A display device comprising:

a display panel including a plurality of display areas;

a driving circuit which controls the display panel;

a timing controller which controls the driving circuit and displays an image on the display panel;

a storage medium which stores a plurality of weight tables respectively corresponding to the plurality of display areas; and a load value generator which generates a first load value corresponding to a first data unit of input image data, and applies a weight to the first load value based on a first weight table of the plurality of weight tables corresponding to a display area of the plurality of display areas in which the first data unit is to be displayed, wherein the timing controller controls the driving circuit with reference to a weighted first load value, wherein a first light-emitting efficiency level associated with a luminance at which a pixel of the display area emits light in response to a maximum grayscale value is defined, wherein a plurality of second light-emitting efficiency levels associated with luminances at which the pixel of the display area emits light in response to a plurality of grayscale values is defined, and wherein the first weight table includes relative values between each of the plurality of second light-emitting efficiency levels and the first light-emitting efficiency level.

2. The display device of claim 1, wherein the load value generator selects, as the weight, a relative value corresponding to a grayscale value of the first data unit among the relative values.

3. The display device of claim 1, wherein the timing controller scales at least a portion of the input image data with reference to the weighted first load value, and displays the image on the display panel according to a scaled input image data.

4. The display device of claim 1, wherein the first data unit includes at least one data pixel of the input image data.

5. The display device of claim 1, further comprising:

a voltage generator which provides a driving voltage to the display panel in response to control of the timing controller, wherein the timing controller adjusts a level of the driving voltage with reference to the weighted first load value.

6. The display device of claim 1, wherein the input image data further includes a second data unit, wherein a display area of the plurality of display areas in which the second data unit is to be displayed is different from the display area in which the first data unit is to be displayed, wherein the load value generator generates a second load value corresponding to the second data unit, and applies a second weight to the second load value based on a second weight table corresponding to the display area in which the second data unit is to be displayed among the plurality of weight tables, and wherein the timing controller controls the driving circuit with reference to a weighted second load value.

7. The display device of claim 1, wherein the input image data further includes a second data unit, wherein the second data unit is displayed in the display area in which the first data unit is to be displayed, wherein the load value generator generates a second load value corresponding to the second data unit and applies a second weight to the second load value based on the first weight table, and wherein the timing controller controls the driving circuit with reference to a weighted second load value.

8. A method for controlling a driving circuit for driving a display panel, the method comprising:

receiving input image data;

generating weighted load values respectively corresponding to data units of the input image data; and controlling the driving circuit with reference to the weighted load values, wherein the display panel includes a plurality of display areas, wherein the generating the weighted load values includes:

generating a first load value according to a first data unit among the data units;

accessing a first weight table corresponding to a display area of the plurality of display areas in which the first data unit is to be displayed among a plurality of weight tables respectively corresponding to the plurality of display areas; and generating a first weighted load value of the weighted load values corresponding to the first data unit by applying a first weight to the first load value according to the first weight table, wherein a first light-emitting efficiency level associated with a luminance at which a pixel of the display area emits light in response to a maximum grayscale value is defined, wherein a plurality of second light-emitting efficiency levels associated with luminances at which the pixel of the display area emits light in response to a plurality of grayscale values is defined, and wherein the first weight table includes relative values between each of the plurality of second light-emitting efficiency levels and the first light-emitting efficiency level.

9. The method of claim 8, wherein a display area of the plurality of display areas in which a second data unit among the data units is to be displayed is different from the display area in which the first data unit is to be displayed, wherein the generating the weighted load values further includes:

generating a second load value according to the second data unit;

accessing a second weight table corresponding to the display area in which the second data unit is to be displayed among the plurality of weight tables; and generating a second weighted load value of the weighted load values corresponding to the second data unit by applying a second weight to the second load value according to the second weight table.

10. The method of claim 8, wherein a second data unit among the data units is displayed in the display area in which the first data unit is to be displayed, wherein the generating the weighted load values further includes:

generating a second load value according to the second data unit; and generating a second weighted load value of the weighted load values corresponding to the second data unit by applying a second weight to the second load value according to the first weight table.

11. The method of claim 8, wherein the first data unit includes at least one data pixel of the input image data.

12. The method of claim 8, wherein the generating the first weighted load value includes:

selecting a relative value corresponding to a grayscale value of the first data unit as the first weight among the relative values.

* * * * *